United States Patent [19]

Rabaey et al.

[11] Patent Number: 5,068,848
[45] Date of Patent: Nov. 26, 1991

[54] MULTI-ACCESS DEVICE

[75] Inventors: Dirk H. L. C. Rabaey, Wijnegem; Didier R. Haspeslagh, Harelbeke, both of Belgium

[73] Assignee: Alcatel N.V., Amsterdam, Netherlands

[21] Appl. No.: 280,701

[22] Filed: Dec. 6, 1988

[30] Foreign Application Priority Data

Dec. 7, 1987 [BE] Belgium ................ 8701402

[51] Int. Cl.$^5$ .............................. H04J 3/02
[52] U.S. Cl. ............................ 370/85.6; 340/825.5
[58] Field of Search ............ 370/85.6, 85.2, 85.1; 340/825.5, 825.51

[56] References Cited

U.S. PATENT DOCUMENTS

4,740,956 4/1988 Hailpern et al. ................ 370/85.2
4,791,553 12/1988 Campanini ................ 340/825.5

Primary Examiner—Douglas W. Olms
Assistant Examiner—Wellington Chin
Attorney, Agent, or Firm—Christie, Parker & Hale

[57] ABSTRACT

A device (MAM) including a common data resource (RAM) to which a first (PR) and several second (LC) stations are coupled. This device includes a first transmission circuit (DB, MD, LD2, LD1, DBU) coupling the common resource and the first station and, for each of the second stations, a second transmission circuit (DB, MD) coupling the common resource and a buffer circuit (LR; LW) and a third transmission circuit (PISO, SO; SI, SIPO) coupling the buffer circuit and the corresponding second station and which is used at predetermined moments (T1, T2, T3; T4). The device also includes a priority circuit (CLC, SG) which grants the highest priority to the requests for the use of the first transmission circuit and the following priorities to the requests for the use of the second transmission circuits in decreasing order of the frequencies (SOS; SIS) of the corresponding predetermined moments.

11 Claims, 5 Drawing Sheets

MULTI-ACCESS DEVICE

TECHNICAL FIELD

The present invention relates to a multi-access device including a common data resource to which a plurality of stations are coupled for the transmission of data.

CLAIM FOR PRIORITY

This application is based on and claims priority from an application first filed in Belgium on 12/07/88 under Ser. No. 87 014027. To the extent such prior application may contain any additional information that might be of any assistance in the use and understanding of the invention claimed herein, it is hereby incorporated by reference.

BACKGROUND ART

Because the data resource is common to all the stations, it is clear that conflicting situations may occur between the stations when data has to be transmitted to or from this resource.

In case there are only two stations, this problem may be solved by using a so-called dual access data resource which has the particularity to be individually linked to each of the stations. A drawback of this solution is that such a dual access resource is expensive.

Another solution, which is also valid when more than two stations are coupled to the common data resource, is to assign to each station a recursive predefined time slot during which a corresponding transmission of data is allowed. A disadvantage of this solution is that, when one or more stations do not require the transmission of data during their allocated time slot, the time then wasted causes the multi-access device to be inefficiently used. Furthermore, two or more stations cannot transmit simultaneously.

DISCLOSURE OF INVENTION

An object of the present invention is to provide a multi-access device which, while being relatively simple and operating efficiently, nevertheless allows transmission of data between the common data resource and at least two stations without conflict even when at least one of these stations has to transmit, i.e. output or input, data at predetermined moments.

According to the invention this object is achieved due to the fact that the multi-access device further includes:

at least one data buffer circuit;

a first data transmission circuit coupling said common data resource and a first of said stations;

at least one second data transmission circuit coupling said common data resource and said data buffer circuit;

at least one third data transmission circuit coupling said data buffer circuit and a second of said stations and used for the transmission of data thereon at predetermined moments;

first requesting means to request the use of said first data transmission circuit for the transmission of data thereon;

second requesting means to request the use of said second data transmission circuit for the transmission of data thereon; and a priority circuit to which said first and second requesting means are coupled and which grants priority to requests of said first requesting means over requests of said second requesting means;

and in that said second requesting means perform a request a time interval before the next occurrence of one of said predetermined moments, said time interval having such a duration that said priority circuit is able to grant priority to said request performed by said second requesting means during this time interval.

Hence, although a common data resource is used and the third data transmission circuit is to be used at predetermined moments, no conflicts for using these access means can occur. Indeed, when for instance the second station wants to input data coming from the common data resource at a first predetermined moment, the second requesting means formulates a request a time interval before this moment. Then, the required data are transferred to the data buffer circuit via the second data transmission circuit as soon as priority to do so is granted by the priority circuit, i.e. when no transmission of data is requested by the first requesting means. In any way, the time interval is so chosen that the transfer of the required data from the common data resource to the data buffer circuit is accomplished prior to the predetermined moment. Obviously, these data can afterwards be transferred from the data buffer circuit to the second station at the predetermined moment even if the first requesting means simultaneously requests the transmission of data between the first station and the common data resource.

The same is true when the second station wants to output, at a predetermined moment, data having the common data resource as destination. Indeed, in this case the second requesting means requests the use of the second data transmission circuit after this predetermined moment but during the time interval preceding the next occurrence of this moment.

In a preferred embodiment, said common data resource is coupled to a plurality of said second stations via a same plurality of said second data transmission circuits, a same plurality of said data buffer circuits and a same plurality of said third data transmission circuits, and said second requesting means are able to request for the use of each of said second data transmission circuits at moments in relation with said predetermined moments.

Another characteristic feature of the present device is that said predetermined moments have constant frequencies which are distinct for each said second data transmission circuits.

Still another characteristic of the present device is that said priority circuit grants the highest priority to the requests of said first requesting means and the following priorities to the requests of said second requesting means in decreasing order of said frequencies at which data are transmitted on said second data transmission circuits.

Yet another characteristic feature of the present device is that it further includes:

first address generation means to provide to said common data resource, the address therein of the location of data transmitted on said first data transmission circuit;

a plurality of second address generation means to provide to said common data resource the addresses therein of the locations of data transmitted on said second data transmission circuits;

an address buffer circuit;

a first address transmission circuit coupling said first address generation means and said common data resource;

a second address transmission circuit coupling said plurality of second address generation means and said address buffer circuit; and a third address transmission circuit coupling said address buffer circuit and said common data resource; and that said first/third address transmission circuit is used simultaneously with said first/second data transmission circuit.

The address provided by one of said second address generation means is stored in said address buffer circuit prior to the next occurrence of one of said predetermined moments of the corresponding one of said second data transmission circuits.

BRIEF DESCRIPTION OF DRAWINGS

The above mentioned and other objects and features of the invention will become more apparent and the invention itself will be best understood by referring to the following description of an embodiment taken in conjunction with the accompanying drawings wherein.

BEST MODE FOR CARRYING OUT THE INVENTION

Figure 1:
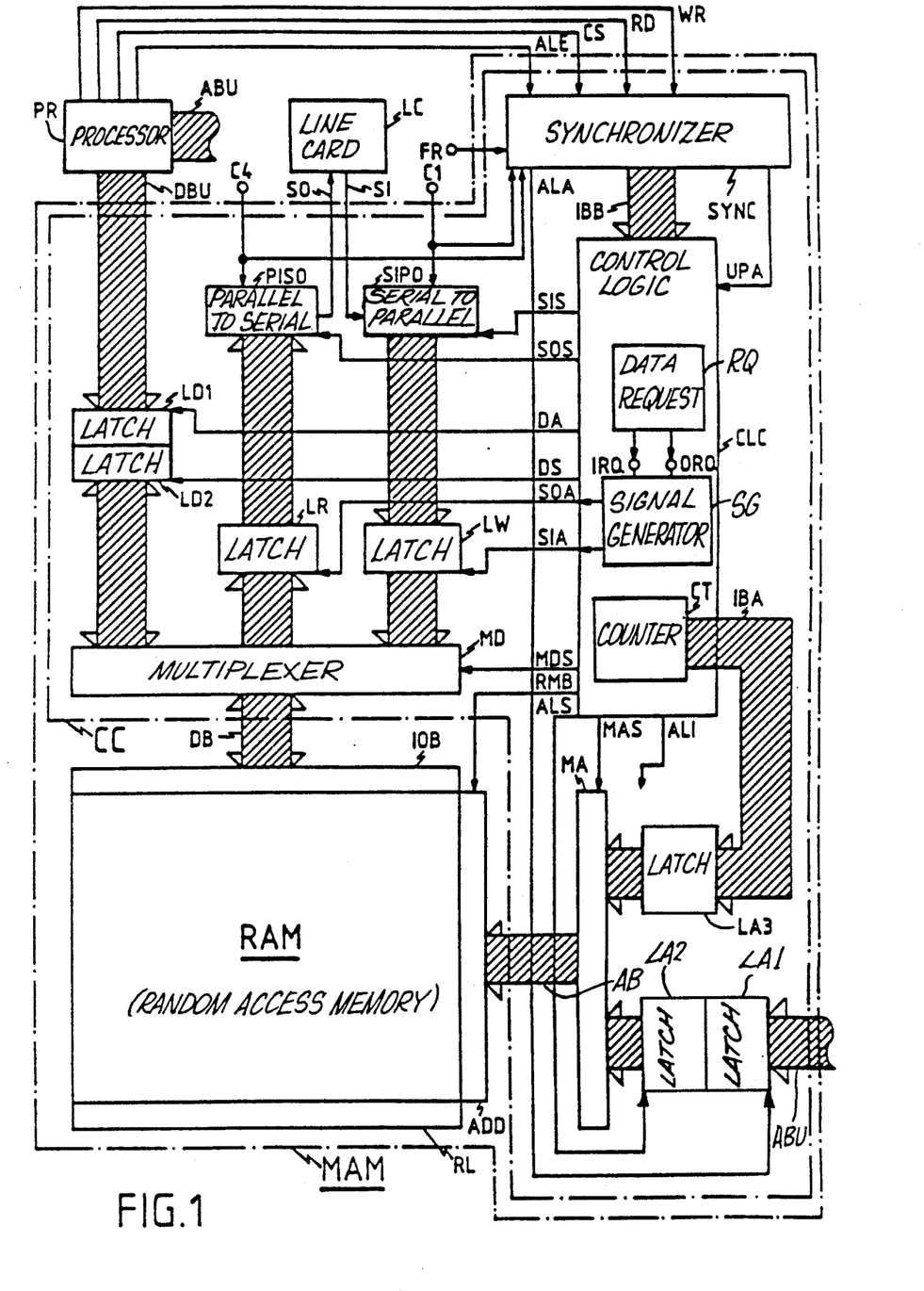
FIG. 1 shows a block diagram of a multi-access device MAM according to the invention and including a Random-Access-Memory RAM associated to a control circuit CC.

The multi-access device MAM shown in FIG. 1 forms part of a digital telecommunication exchange which moreover includes a switching network, a plurality of telecommunication line circuits and a processor PR. The MAM includes a Random-Access-Memory RAM with a single data access bus DB and an associated Control Circuit CC coupled to it via a single address bus AB. The memory RAM is used to store digital signals to be sent to 8 telecommunication line circuits mounted on a line card LC and to the processor PR or to be received from these 8 line circuits and this processor. These signals are transmitted on input and output links SI and SO interconnecting MAM and LC and on the bus DBU which interconnects MAM and PR respectively. The signals coming from or going to the 8 line circuits of each line card LC are transmitted on the respective serial links SI and SO according to Time Division Multiplex (TDM) techniques. From now on the line circuits are indicated by LC.

Inside the MAM the pair of input and output links SI and SO and the bus DBU are coupled to the RAM so that the processor PR and the 8 line circuits LC are associated to a same RAM. However, in practice the processor PR is generally provided in common for a plurality, e.g. 3, of such RAMs each associated to a distinct line card, i.e. to 8 line circuits. In this case the latch LD2 shown is coupled to these RAMs through a demultiplexer (not shown) and the common access bus DB.

The device MAM is controlled by a clock signal C4 (FIG. 2, part a) with a bitrate of 4 Megabits/second and has three main functions:

to output data stored in the RAM towards the line circuits LC via the serial output link SO at the clock bitrate of 4 Megabits/second; these data are included in the signal SOUT (FIG. 2, part b) flowing on the serial output link SO and comprising 8 channels OC0 to OC7 which are subdivided into 8 bytes OB0 to OB7 having 8 bits Ob0 to Ob7 each;

to input data from the line circuits LC via the serial input link SI at a bitrate of 1 Megabit/second; these data are included in the signal SIN (FIG. 2, part b) flowing on the serial input link SI and comprising 8 channels IC0 to IC7 each constituted by one byte having 8 bits Ib0 to Ib7 of which only a first half Ib0A to Ib7A is effectively used whilst the second half Ib0B to Ib7B is not used and corresponds to a high impedance status; and to read data from and write data into the RAM according to instructions received from the processor PR which operates in an asynchronous way; these data have a bitrate of 4 Megabit/second.

It is to be noted that the data outputting and reading are identical operations and that these different words are only used to distinguish between the operations of the line circuits LC and those of the processor PR respectively. The same is true for the distinction between the words input and write.

In the present telecommunication system, data from the RAM should be output to the line circuits LC in a synchronous way and also data from these line circuits LC and to be transferred to the RAM should be input in a synchronous way. On the contrary, data transfers from the RAM to the processor PR and vice versa (read and write operations) may occur asynchronously. Moreover, data transfers on the common access bus DB of the RAM towards and from the processor PR should have priority over data transfers on this bus DB towards and from the line circuits LC. These various conditions are fullfilled without conflict in the way described hereafter.

The Random-Access-Memory RAM of the device MAM has an associated data input/output buffer IOB, an address decoder ADD, and a restore logic circuit RL, whilst the control circuit CC includes:

a data multiplexer MD;
an address multiplexer MA;
two bidirectional data latches LD1 and LD2;
two data latches LR and LW;
a parallel-in-serial-out and latch circuit PISO;
a serial-in-parallel-out and latch circuit SIPO;
three address latches LA1, LA2 and LA3;
a control logic circuit CLC; and
a 4 Megabits/second synchronizer SYNC.

The control circuit CC is coupled to the processor PR via a bidirectional 8 bits parallel data bus DBU already mentioned and PR is coupled to CC via an unidirectional 8 bits parallel address bus ABU and control lines ALE (Address Latch Enable), CS (Chip Select), RD (ReaD) and WR (WRite) on which like-named signals flow respectively. CC is further coupled to the line circuits LC via the serial output link SO and the serial input link SI and to the above mentioned switching network from which it receives, on like-named control lines, a frame signal FR (FIG. 2, part a), the clock signal C4 (FIG. 2, part a) and another clock signal C1. The frame signal FR has a frequency of 8 Kilohertz whilst C4 and C1 have a bitrate of 4 and 1 Megabits/second respectively. It is to be noted that the 1 Megabits/second clock signal C1 is synchronized with and derived from the clock signal C4 in a frequency division circuit well known in the art and is not described here.

The data bus DB links the data multiplexer MD to the data input/output buffer IOB of the RAM, whilst an address bus AB links the address multiplexer MA of CC to the address decoder ADD of the RAM.

The data bus DBU of the processor PR is connected to the data multiplexer MD via the cascade connection of the two bidirectional data latches LD1 and LD2. MD is further connected to the serial output link SO via the cascade connection of the data latch LR and the parallel-in-serial-out and latch circuit PISO, and the serial input link SI is connected to MD via the cascade connection of the serial-in-parallel-out and latch circuit SIPO and the data latch LW. PISO and SIPO are respectively controlled by the clock signals C4 and C1.

The address bus ABU of the processor PR is connected to the address multiplexer MA via the cascade connection of the address latches LA1 and LA2. An internal address bus IBA links the control logic circuit CLC to the address multiplexer MA via the address latch LA3 and carries the addresses of the data of the line circuits LC which have to be read from or written into the RAM.

Figure 2:
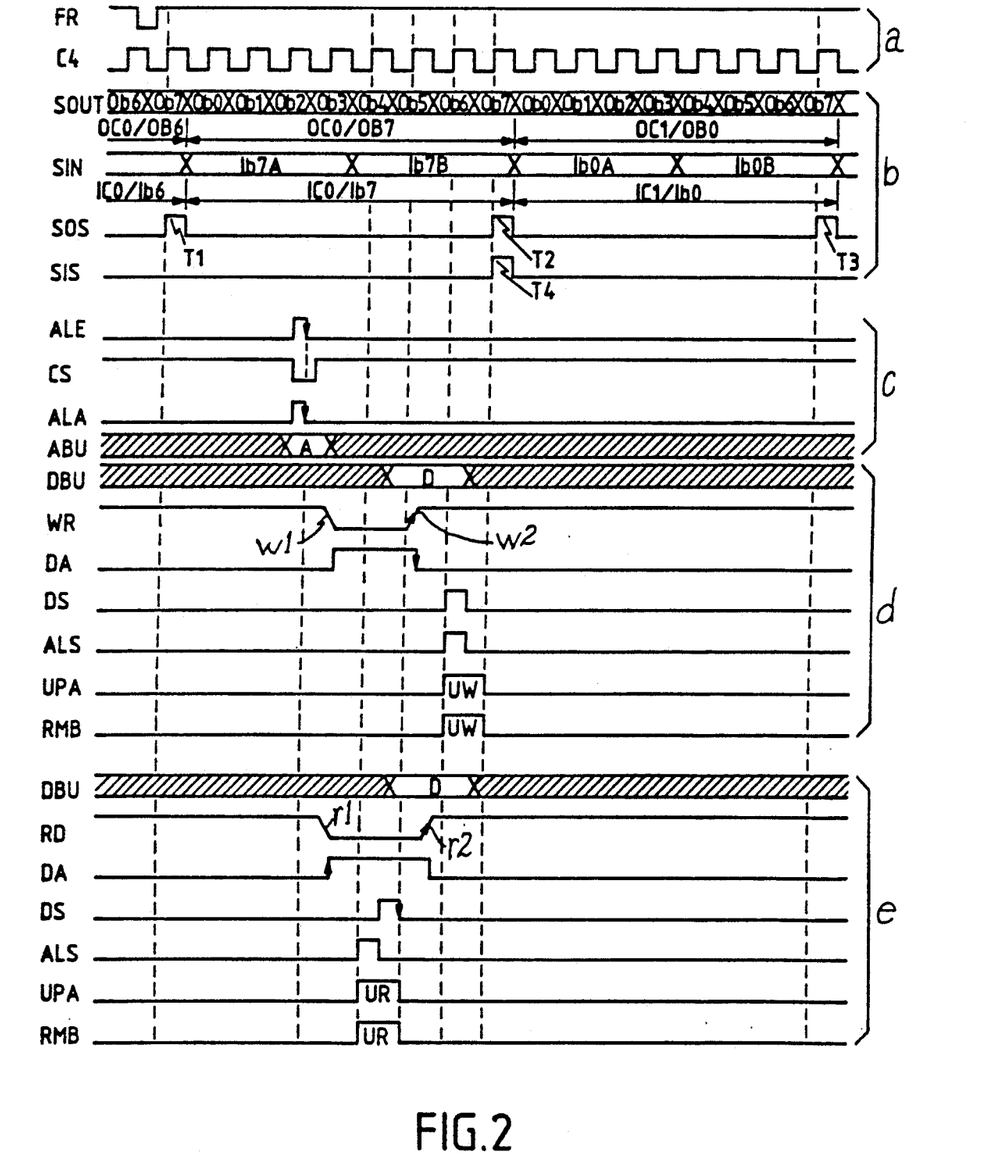
FIGS. 2 and 3 show signals used in the control logic circuit CLC of the control circuit CC of FIG. 1.

The control signals ALE, CS, RD and WR are all supplied from the processor PR to the 4 Megabits/second synchronizer SYNC which synchronizes them with the clock signal C4 and provides a control signal UPA (Processor Active; FIG. 2, parts d and e and FIG. 3, parts b, c and d) which is transmitted to the control logic circuit CLC via a separate control line whilst other control signals are supplied from SYNC to CLC via a second internal bus IBB.

The latches LD1, LD2; LR; LW; LA2 and LA3 are controlled by the control logic circuit CLC via respective internal control lines DA, DS; SOA; SIA; ALS and ALI carrying like-named signals. The address latch LA1 is directly controlled by the synchronizer SYNC via an internal control line ALA carrying a like-named signal, whilst the data MD and address MA multiplexers are controlled by the control logic circuit CLC via respective internal selection lines MDS and MAS carrying like-named signals. Also, the circuits PISO and SIPO are controlled by the circuit CLC via respective internal control lines SOS and SIS carrying like-named signals.

By making reference to the parts a to e of FIG. 2, the data output and input operations as well as the read and write operations of the multi-access device MAM are first described separately hereafter, i.e. without considering possible interferences of such operations.

1. Transfer of data from the memory RAM to the line circuits LC (data output; FIG. 2, part b).

The data bytes OB0/OB7 to be transferred from the RAM to the line circuits LC are stored in this memory RAM at successive addresses provided by a counter CT included in the control logic circuit CLC. Each address is transmitted from CLC to the address latch LA3 via the internal address bus IBA. Under the control of the signal ALI which opens the address latch LA3 and so releases the address stored therein and the selection signal MAS which indicates to the address multiplexer MA that the bus which connects it to LA3 has to be selected, this address is transmitted to the address decoder ADD of the RAM via the address bus AB.

When the control signal RMB (RAM Busy) generated by CLC is activated, the data byte stored in the RAM location then indicated by the address in ADD is loaded on the data bus DB. This data byte is then transferred to and stored in the data latch LR selected by the data multiplexer MD according to the selection signal MDS and opened by a control signal SOA (Serial Out Asynchronous).

Every 2 microseconds, i.e. at the occurrence of each of the periodic pulses T1, T2, T3 of the control signal SOS (Serial Out Synchronous), the data byte OB0/OB7 in LR is transferred on the serial output link SO via the circuit PISO. Indeed, such a pulse T1/T3 opens the PISO circuit and allows the byte latched in LR to be transferred to the PISO circuit and, therein, this byte OB0/OB7 is converted from the parallel to the serial form and put on the serial output link SO. It is to be noted that the pulses of the control signal SOS are synchronized with the signals C4 and FR and are generated every last bit Ob7 of each output byte OB0/OB7 of the output channels OC0/OC7.

2. Transfer of data from the line circuits LC to the memory RAM (data input; FIG. 2, part b).

The bytes of data or channels IC0 to IC7 incoming on the serial input link SI at a bitrate of 1 Megabit/second are first stored in the SIPO circuit. When a complete byte IC0/IC7 is present in this SIPO circuit, i.e. every 16 microseconds, a pulse T4 is generated by CLC. This pulse forms part of the control signal SIS (Serial Input Synchronous). By T4 the SIPO circuit is opened and the byte IC0/IC7 of input data stored therein is transferred in a parallel way to the data latch LW wherein it remains until the signal SIA is activated. It is to be noted that the control signal SIS is synchronized with the signals C4 and FR, and thus also with the clock signal C1, and is generated in coincidence with the last bit Ib7, and more particularly with the second half Ib7B thereof, of each input byte or channel IC0/IC7. In the same way as for the output operation described above, the locations at which the bytes of input data have to be stored in the memory RAM are also at successive addresses. Indeed, these addresses are also supplied to the address decoder ADD of the memory RAM by the counter CT included in the control logic circuit CLC. The address is then transmitted to ADD via the address bus IBA, the address latch LA3, the address multiplexer MA and the address bus AB. When no other operation of the RAM is required, the address is released from LA3 under the control of the signal ALI and is transferred to ADD via the address multiplexer MA under the control of the selection signal MAS.

CLC then supplies a control signal SIA (Serial Input Asynchronous) which opens the data latch LW and a selection signal MDS which orders the data multiplexer MD to select the bus connected to this latch LW. The data latched in LW are so released to the input/output buffer IOB of the RAM from where they are stored in the location which is indicated by the address decoder ADD as soon as the control signal RMB is activated.

3. Transfer of data from the processor PR to the memory RAM (data write; FIG. 2, part d).

When the processor PR wants to write data into or read data from the memory RAM, it activates the ALE and the CS signals (FIG. 2, part c) which indicate to the device MAM that the corresponding address A is available on the address bus ABU and that the data D will be written into or read from the memory RAM via the data bus DBU. The signal ALA is then activated by SYNC to open the address latch LA1 in order to receive and store therein the address A then present on the address bus ABU. This address A is then also immediately transferred and stored in the address latch LA2 interconnected with LA1.

In this case of a data write operation, a write signal WR (FIG. 2, part d) is supplied by the processor PR. The front edge w1 of WR indicates a forthcoming write operation and orders CLC to activate the signal DA (Data Asynchrone) which opens the data latch LD1. This data latch LD1 is then ready to receive and store the data D which will be loaded on the data bus DBU by the processor PR. The rear edge w2 of the signal WR indicates to the control circuit CC that the data D are now on the data bus DBU and thus also stored in the latch LD1. This latter latch LD1 is then closed by the control logic circuit CLC which de-activates the control signal DA. The data D are then also immediately transferred and stored in the data latch LD2 which is interconnected with LD1. At the next occurrence of the clock signal C4, the control signals DS (Data Synchrone) and ALS are activated by CLC and the selection signals MDS and MAS controlling the respective multiplexers MD and MA are set to select the busses DBU and ABU respectively. The data D and the address A of the RAM wherein they have to be stored are then simultaneously provided to this memory RAM, the signal RMB activated by CLC validating this write operation on the address decoder ADD. The indication UW in the signal RMB shown in part d of FIG. 2 means that the latter is activated for a write operation of the processor PR. During this write operation also the signal UPA is activated indicating to the control logic circuit CLC that a write operation of the processor PR indicated by UW in UPA is running and that possible data output or input operations of the line circuits LC should be delayed. Such a priority process will be described later.

4. Transfer of data from the memory RAM to the processor PR (data read; FIG. 2, part e).

This operation is similar to the data write operation described above. This means that the signals ALE, CS, ALA and ABU shown in FIG. 2, part c are also considered here.

Referring to FIG. 2, part e, a read signal RD is supplied to the control circuit CC by the processor PR. The front edge r1 of RD indicates a forthcoming read operation and orders CLC to activate the signal DA which opens the data latch LD1. This data latch LD1 will remain open until the end of this read operation. At the next occurrence of the clock signal C4, the control signals DS and ALS are activated by CLC to open the latches LD2 and LA2 respectively, and the selection signals MDS and MAS are set to select busses DBU and ABU respectively. Simultaneously, the signals UPA and RMB are also activated, UR in FIG. 2 indicating that these signals are activated for a read operation of the processor PR. The read address provided to ADD and valided by the control signal RMB causes the data stored in the memory RAM at that address to be transferred to the data bus DBU. Since the data latches LD2 and LD1 are open, the data are immediately transmitted to the processor PR. The signals DS, ALS, UPA and RMB are then de-activated and the processor PR acknowledges this read operation by de-activating the signal RD whose rear edge r2 causes the control signal DA to be de-activated in turn by CLC.

Figure 3:
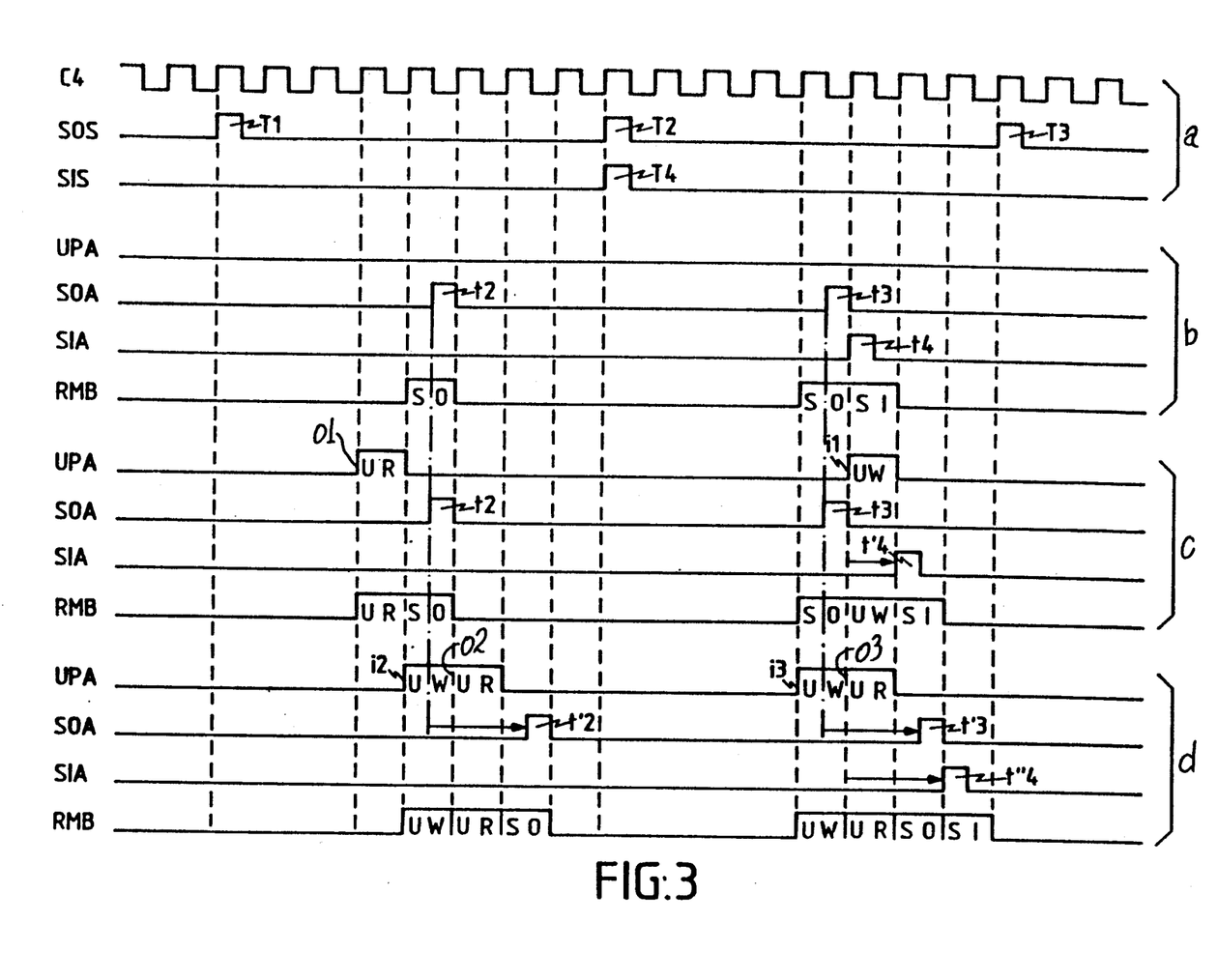

Three examples of simultaneous access to the device MAM are shown in FIG. 3, parts b, c and d respectively. The signals shown in these examples make reference to the above mentioned signals C4, SOS and SIS and the pulses T1, T2, T3 and T4 of FIG. 2, parts a and b, and reproduced in FIG. 3, part a.

In a first example (FIG. 3, part b), the signal UPA is permanently de-activated meaning that no operation is required by the processor PR. The signal SOA is activated at moments corresponding to pulses t2 and t3 which occur four clock cycles before the respective pulses T2 and T3 of the signal SOS and when the clock signal C4 is low or at a logical level 0. This delay of four clock cycles is necessary in case the processor PR should require write or read access to the memory RAM. Indeed, since the processor PR has the highest access priority to the memory RAM, the operations that it requires must be executed first and the transfer of data to the data latch LR must then be delayed.

This delay in the activation of the signal SOA is of one clock cycle for each operation of the processor PR. By taking into account that the data to be output to the line circuits LC must be stored in the data latch LR prior to the next occurrence of the pulses T2, T3 of the signal SOS and by also taking into account the maximum number of consecutive operations that the processor PR can perform, i.e. the maximum number of clock cycles that the activation of the signal SOA can be delayed, it has been found that the delay of 4 clock cycles between the activations of the signals SOA and SOS is sufficient in practice.

As mentioned above, the pulses t2 and t3 of the signal SOA indicate that the data latch LR is open and that the data to be output to the line circuits LC via the serial output link SO may be loaded therein. In the present case, the signal SOA and the simultaneously activated signal RMB indicated by SO (Serial Out) need not to be delayed because no operation is required by the processor PR. The output data are thus present in the data latch LR at the de-activation of the signals the SOA and RMB and are ready to be transferred to the PISO circuit at the next occurrence of the signal SOS, i.e. during the pulses T2, T3 which open this PISO circuit.

It is to be noted that the SO operation start one half clock cycle before the pulse t2, i.e. when the clock signal C4 is high or at the logical level 1, and the signal RMB stays activated during the whole clock cycle.

The signal SIA is activated at a moment corresponding to a pulse t4 to transfer to the RAM the data then present in the data latch LW. These data were previously loaded in LW during a pulse T4 of the signal SIS, i.e. when the SIPO circuit was opened. Since the input frequency SIS (1 Megabit/second) is lower than the output frequency SOS (4 Megabits/second), the pulse t4 of the signal SIA which must occur after the pulse T4 of the signal SIS and when the clock signal C4 is high has a lower priority than the pulse t3 of the signal SOA which must occur before the pulse T3 of the signal SOS and when the clock signal C4 is low. Therefore, the pulse t4 together with the corresponding activation of the signal RMB indicated by SI (Serial In) occur as soon as possible after the pulse T4 but after the pulse t3. In this example, the pulses t3 and t4 are not delayed because no operation is requested by the processor PR, the signal RMB is thus activated one half clock cycle prior to the pulse t3 and stays activated for two consecutive clock cycles corresponding respectively to the successive operations SO and SI of the line circuits LC.

In a second example (FIG. 3, part c), additionally to the above data output SO and input SI operations of the line circuits LC, the processor PR requires a read operation UR at a moment o1 and a write operation UW at a moment i1. These read UR and write UW operations of the processor PR both correspond to an activation of the signal UPA for a whole clock cycle and starting when the clock signal C4 is high.

In this example, the moment o1 occurs 1.5 clock cycle before the pulse t2 of the signal SOA and the moment i1 occurs immediately after the pulse t3 of the signal SOA and simultaneously with the pulse t4 of the signal SIA. As indicated by UR in the signal RMB, the read operation UR of the processor PR is executed immediately at the moment o1 and is followed by the data output operation SO of the line circuits LC described in the first example and which is not delayed because the preceding operation UR was completed when the operation SO had normally to start. Summarizing, the signal RMB is successively activated from the moment o1 for the two consecutive clock cycles corresponding to the operations UR and SO respectively.

Also, the second data output operation SO corresponding to the pulse t3 is not delayed because it does not hinder the following write operation UW of the processor PR starting at the moment i1. However, because the operations of the processor PR have the highest priority, the data input operation SI of the line circuits LC simultaneously required by the pulse t4 of the signal SIA has to be delayed and processed as soon as possible after the completion of the write operation UW of the processor PR. In this case, the activation of the signal SIA is only delayed by one clock cycle so that the data input operation SI of the line circuits LC occurs at a moment corresponding to a pulse t'4 which appears one clock cycle after the pulse t4. The signal RMB is thus successively activated for three clock cycles corresponding to the respective operations SO, UW and SI. Since the next activation of the signal SIS will occur much later, the above delay of one clock cycle of the pulse t4 of the signal SIA will not affect the normal operation of the device MAM.

In a third and last example (FIG. 3, part d), additionaly to the data output SO and input SI operations described in the first example, the processor PR requires two times a write operation UW immediately followed by a read operation UR. The first write operation UW starts at a moment i2 occuring one half clock cycle before the pulse t2 of the signal SOA whilst the first read operation UR starts one clock cycle later at a moment o2. Because of the priority allocated to the operations of the processor PR, the data output operation SO which had normally to start one half clock cycle before the pulse t2 will be delayed until the operations UW and UR of the processor PR are completed. In this case the delay is thus of two clock cycles and the pulse t2 of the signal SOA corresponding to the operation SO becomes t'2. The signal RMB is thus activated from the moment i2 for three consecutive clock cycles corresponding to the successive operations UW, UR and SO. It is to be noted that the operation SO although delayed by two clock cycles is completed before the pulse T2 of the signal SOS so that the data to output will be present in the data latch LR at this pulse T2. The data output operation SO to the line circuits LC is thus not hindered by the preceding operations UW and UR of the processor PR.

The second write operation UW of the processor PR starts at a moment i3 which occurs one half clock cycle before the pulse t3 of the signal SOA and the second read operation UR starts at a moment o3 which occurs one clock cycle after i3 and corresponds to the pulse t4 of the signal SIA. For the above mentioned reasons, the operations SO and SI are now both delayed by two clock cycles and occur at moments corresponding to the pulses t'3 and t"4 of the signals SOA and SIA respectively. In this case, the signal RMB is activated from the moment i3 for four consecutive clock cycles corresponding to the successive operations UW, UR, SO and SI.

As mentioned above and described in these three examples the highest priority is always granted to the write UW or read UR operations of the processor PR and the following priorities are successively granted to the date output operation SO and to the data input operation SI of the line circuits LC.

Figure 4:
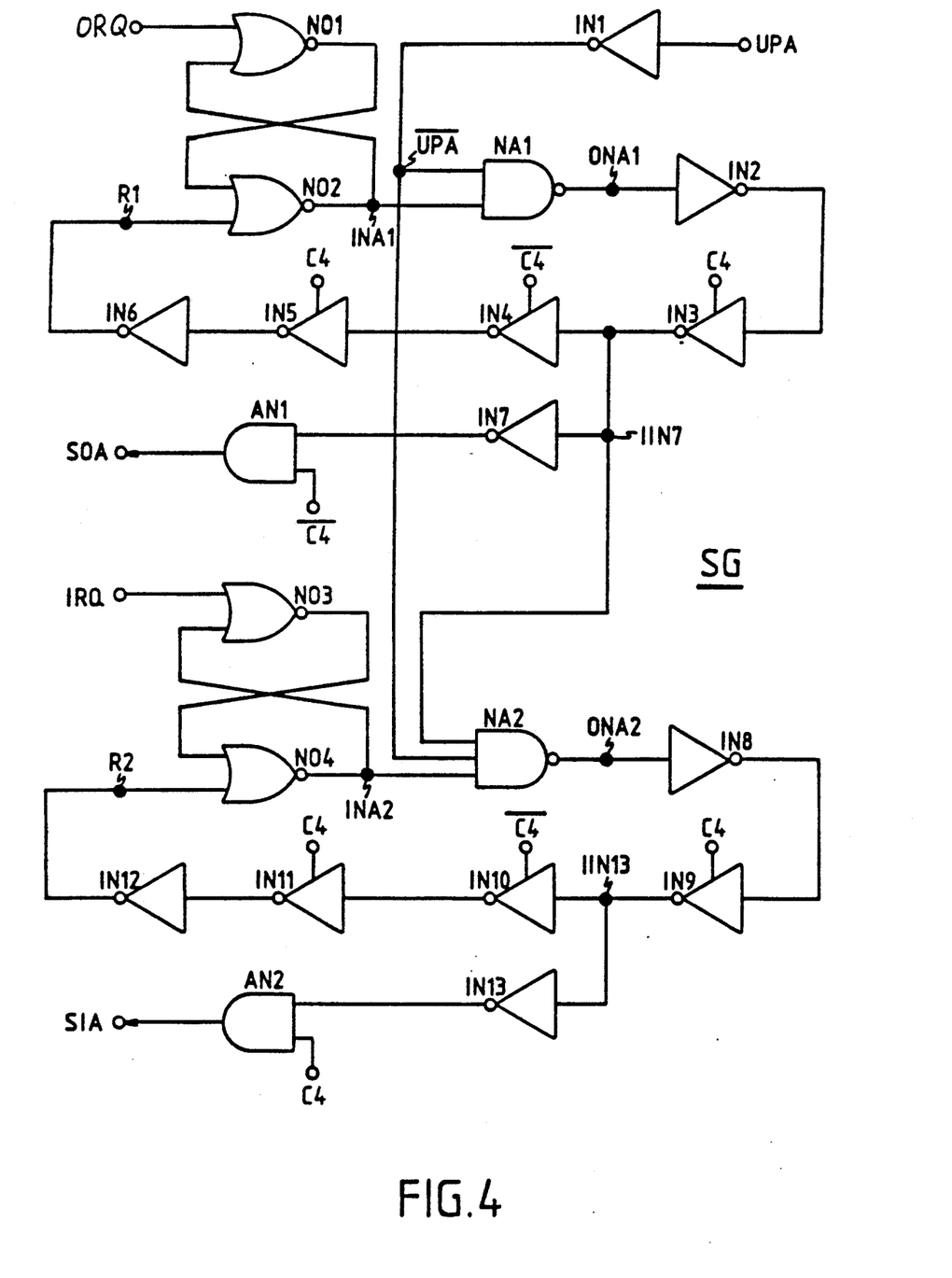
FIG. 4 is a schematic representation of a signal generator SG included in CLC.

A signal generator SG able to generate the pulses of the signals SOA and SIA by taking into account the above mentioned priorities is included in the control logic circuit CLC of FIG. 1 and is schematically represented in FIG. 4. As already mentioned, to transfer data from the RAM to the line circuits LC, the signal SOA which opens the data latch LR to store therein data coming from the RAM must be activated before the corresponding signal SOS which opens the circuit PISO and allows the data previously stored in LR to be transmitted to these line circuits LC via the circuit PISO. Therefore, a data output request signal ORQ is generated in the control logic circuit CLC in relation with the clock signal C4 and the frame signal FR and in function of a forthcoming pulse T1/T2/T3 of the signal SOS. Similarly, CLC generates a data input request signal IRQ which should activate the signal SIA in order to open the data latch LW. As also mentioned above, this signal IRQ must occur after the pulse T4 of the signal SIS which opens the circuit SIPO.

Figure 5:
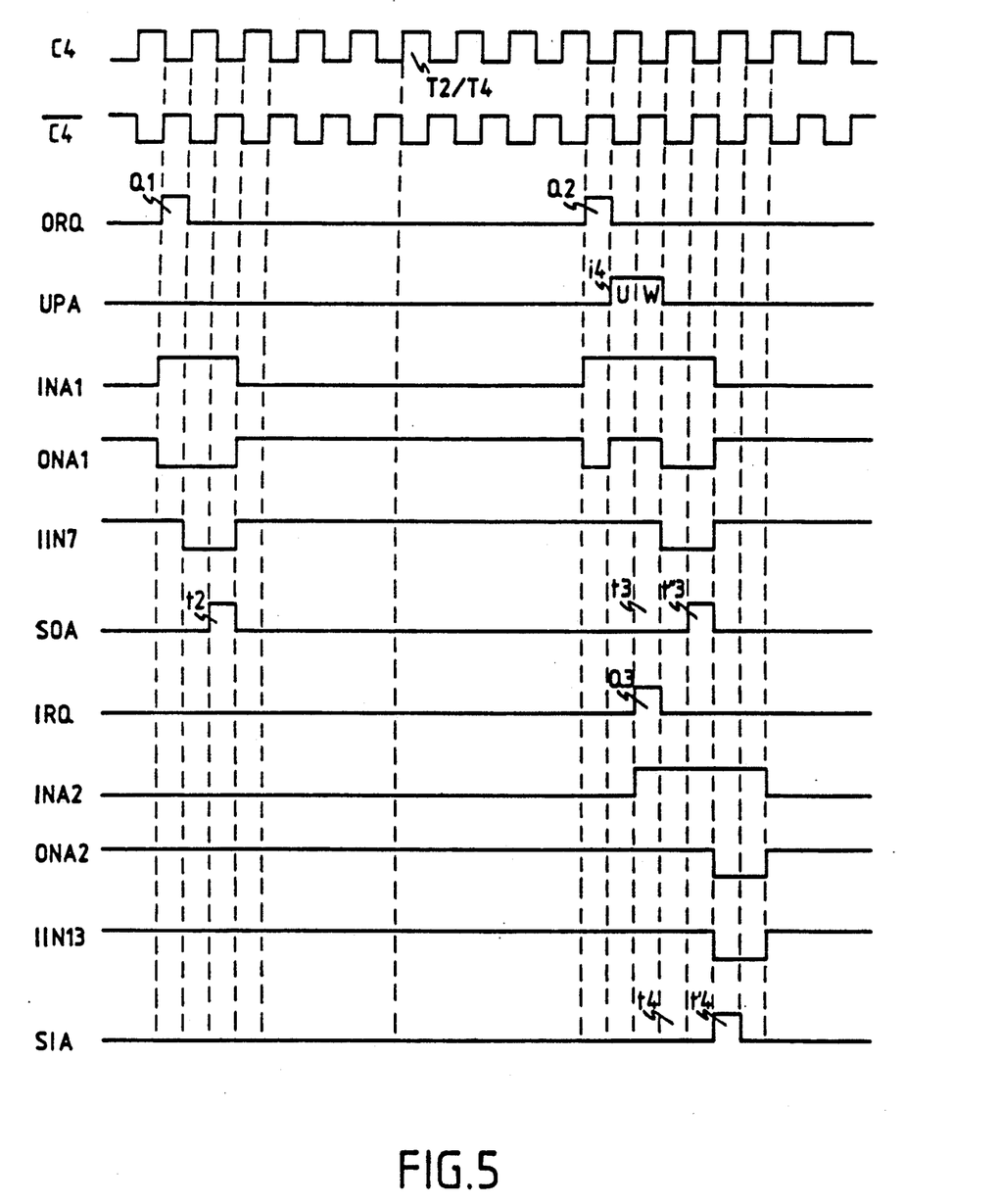
FIG. 5 shows signals used in the signal generator SG of FIG. 4.

Summarizing, the pulses Q1 and Q2 of the signal ORQ shown in FIG. 5 and activated by the control logic circuit CLC occur five clock cycles before the respective pulses T2 and T3 (not shown in FIG. 5) of the signal SOS. The pulses Q1 and Q2 correspond to a low state of the clock signal C4. On the other hand, the pulse Q3 of the signal IRQ also shown in FIG. 5 and activated by CLC occurs five clock cycles after the pulse T4 of the signal SIS and also when the clock signal C4 is low. In this way and according to the above mentioned bitrates of the signals SOS and SIS, the pulse Q3 occurs one clock cycle after the pulse Q2. These two pulses thus do thus not hinder each other and the above mentioned priority is respected. The signals ORQ and IRQ are supplied by CLC to the signal generator SG shown in FIG. 4 and which will be described hereinafter in accordance with the signals shown in FIG. 5 and appearing on respective like-named terminals of SG.

The signal generator SG has a first input terminal ORQ to which the like-named data output request signal is applied and which is connected to the "Set" input of an RS flip-flop constituted by two logical NOR gates NO1 and NO2 intercoupled as shown. The output INA1 of this RS flip-flop NO1/NO2 is connected to a first input of a NAND gate NA1 whilst the signal UPA is applied to a like-named input terminal of SG which is coupled to a second input $\overline{\text{UPA}}$ of this gate NA1 via an inverter IN1. The output ONA1 of the gate NA1 is coupled to the "Reset" input R1 of the above RS flip-flop NO1/NO2 via the series connection of five inverters IN2, IN3, IN4, IN5 and IN6. The output IIN7 of the inverter IN3 is further connected to a first input of an AND gate AN1 via an inverter IN7 whilst the inverse $\overline{C4}$ of the clock signal C4 is supplied to a second input of this gate AN1 which provides, at an output terminal SOA connected to its output, the signal SOA which controls the data latch LR.

It is to be noted that the inverters IN3, IN4 and IN5 are controlled by the respective signals C4, $\overline{C4}$ and C4. This means that a signal at the input of these inverters only appears, inverted, at its output when the corresponding control signal (C4, $\overline{C4}$) is high. Then, the output signal remains unchanged as long as this control signal is low and can only be modified when this control signal becomes again high.

The signal generator SG has a second input terminal IRQ to which the like-named data input request signal is applied and which is connected to the "Set" input of a second RS flip-flop comprising the NOR gates NO3 and NO4 intercoupled as shown. The output INA2 of this second RS flip-flop NO3/NO4 is connected to a first input of a second NAND gate NA2 which as a second and a third input to which the signals $\overline{UPA}$ and IIN7 are applied respectively. The output ONA2 of the gate NA2 is coupled to the "Reset" input R2 of the second RS flip-flop NO3/NO4 via the series connection of five inverters IN8, IN9, IN10, IN11 and IN12. As for IN3, IN4 and IN5, the inverters IN9, IN10 and IN11 are controlled by the respective signals C4, $\overline{C4}$ and C4. The output IIN13 of the inverter IN9 is further connected to a first input of a second AND gate AN2 via an inverter IN13 whilst the clock signal C4 is applied to a second input of this gate AN2. The output of the gate AN2 is connected to an output terminal SIA on which appears the signal SIA which controls the data latch LW.

The above mentioned clock signal C4 and its inverse $\overline{C4}$ are shown in FIG. 5 and the location of the pulse T2/T4 is indicated in this signal as a reference to FIGS. 2 and 3. In FIG. 5 also the signal UPA is shown and, as an example, a write operation UW is requested by the processor PR at a moment i4 occurring four clock cycles after the pulse T2/T4 and when the clock signal C4 is high.

The pulse Q1 normally causes, as will be described below, the signal SOA to be activated as represented by the pulse t2 occurring four clock cycles before the corresponding pulse T2 of the signal SOS and when the clock signal C4 is low.

It is to be noted that, when the signal generator SG is at rest, the outputs of the RS flip-flops NO1/NO2 and NO3/NO4 are low or at a logical level 0, i.e. when no signal is applied to their respective "Set" inputs ORQ and IRQ. The output of these flip-flops becomes high or at a logical level 1 when the signal at their "set" input is high, and remains in that state as long as the signal applied to their "Reset" input is low.

Since the signal UPA is low during the pulse Q1, its inverse $\overline{UPA}$ is high and, at the activation of the signal ORQ, the two inputs of the gate NA1 are thus high so that the output signal ONA1 which was previously high becomes low. Because R1 is still low, the signal INA1 and thus also ONA1 remain high after the de-activation of ORQ, i.e. after the pulse Q1. As a consequence, the signal IIN7 which was previously high becomes low with the clock signal C4 going to the logical level 1 and remains low when C4 goes back to the logical level 0. The pulse t2 of the data output signal SOA is then generated at the required moment, i.e. four clock cycles before the pulse T2. One clock cycle after the pulse Q1, a logical level 1 appears at the input R1 of the flip-flop NO1/NO2. The signal INA1 then becomes low and, since $\overline{UPA}$ is still high, the output ONA1 of NA1 becomes again high. Also the signal IIN7 is reset to high and the signal generator SG is again in its rest state.

At the next activation of the signal ORQ, i.e. at the pulse Q2, INA1 becomes high and ONA1 becomes low. At that moment, IIN7 remains high because the clock signal C4 is low. After the pulse Q2 and due to the activation UW of the signal UPA, the signal ONA1 becomes high. As a result, the signal IIN7 remains high and the signal SOA is not activated at the occurrence of the pulse t3 as expected.

When the signal UPA returns to the low level, INA1 is still high because the logical level 1 has not been supplied to the terminal R1. OAN1 then becomes low and, because C4 is high, IIN7 becomes low for one clock cycle. A pulse t″3 of the signal SOA appears thus one clock cycle after the expected pulse t3 of this signal. As required, the operation UW of the processor PR is thus executed before the data output operation to the line circuits LC.

The pulse Q3 of the signal IRQ causes the signal INA2 to become high and to stay in that state until a logical level 1 is supplied to the terminal R2 of the flip-flop NO3/NO4. Due to the signal $\overline{UPA}$ which is then low, the signal ONA2 remains high and the same is true for the signal IIN13. After the pulse Q3, $\overline{UPA}$ becomes high but IIN7 becomes low so that ONA2 and thus also IIN13 remain high and that the signal SIA can not be activated at the expected moment corresponding to the pulse t4. A clock cycle after the pulse Q3, the signals IIN7, $\overline{UPA}$ and INA2 are all three at the logical level 1 so that the signal ONA2 then becomes low. Because the clock signal C4 is then high, the signal IIN13 becomes low and stays in that state for one clock cycle. Simultaneously, the signal SIA is activated for one-half clock cycle. This produces the pulse t′4 which appears one clock cycle after the expected pulse t4 of the signal SIA. As mentioned above, this delay of one clock cycle is due to the operation UW of the processor PR. Because of the succession of the pulses UW, t″3 and T′4 of the respective signals UPA, SOA and SIA, the priorities of the operations of the device MAM are respected.

Two clock cycles after the pulse Q3 of the signal IRQ, a logical level 1 appears on the terminal R2 of the flip-flop NO3/NO4 whose output signal INA2 is then reset to a logical level 0. The signal generator SG is then back in its rest status.

While the principles of the invention have been described above in connection with specific apparatus, it is to be clearly understood that this description is made only by way of example and not as a limitation on the scope of the invention.

We claim:

1. Multi-access device including a common data resource to which a plurality of stations are coupled for the transmission of data, comprising:
   at least one data buffer circuit;
   a first data transmission circuit coupling said common data resource and a first of said stations;
   at least one second data transmission circuit coupling said common data resource and said data buffer circuit;
   at least one third data transmission circuit coupling said data buffer circuit and a second of said stations and used for the transmission of data thereon at predetermined moments;

first requesting means for requesting the use of said first data transmission circuit for the transmission of data thereon;

second requesting means for requesting the use of said second data transmission circuit for the transmission of data thereon; and a priority circuit to which said first and second requesting means are coupled and which grants priority to requests of said first requesting means over requests of said second requesting means;

wherein said second requesting means performs a request a time interval before the next occurrence of one of said predetermined moments, said time interval having such a duration that said priority circuit is able to grant priority to said request performed by said second requesting means during said time interval.

2. Multi-access device according to claim 1, wherein said common data resource is coupled to a plurality of said second stations via a corresponding plurality of said second data transmission circuits, a corresponding plurality of said data buffer circuits and a corresponding plurality of said third data transmission circuits, and said second requesting means is able to request the use of each of said second data transmission circuits at moments in relation with said predetermined moments.

3. Multi-access device according to claim 2, wherein said predetermined moments have constant frequencies which are distinct for each of said second data transmission circuits.

4. Multi-access device according to claim 3, wherein said priority circuit grants the highest priority to the requests of said first requesting means and the following priorities to the requests of said second requesting means in decreasing order of said frequencies at which data are transmitted on said second data transmission circuits.

5. Multi-access device according to claim 3, wherein the requests of said first requesting means occur at random moments, and the requests of said second requesting means occur at moments having constant frequencies identical to said constant frequencies of said predetermined moments of said second data transmission circuits.

6. Multi-access device according to claim 2, wherein said first and second data transmission circuits are coupled to said common data resource via multiplexing means and common data access means.

7. Multi-access device according to claim 2, further comprising:

first address generation means to provide to said common data resource the address therein of the location of data transmitted on said first data transmission circuit;

a plurality of second address generation means to provide to said common data resource the respective addresses therein of the locations of data transmitted on said second data transmission circuits;

an address buffer circuit;

a first address transmission circuit coupling said first address generation means and said common data resource;

a second address transmission circuit coupling said plurality of second address generation means and said address buffer circuit; and a third address transmission circuit coupling said address buffer circuit and said common data resource;

wherein said first/third address transmission circuit is used simultaneously with said first/second data transmission circuit.

8. Multi-access device according to claim 7, wherein the address provided by one of said second address generation means is stored in said address buffer circuit prior to the next occurrence of a said predetermined moment of the corresponding one of said second data transmission circuits.

9. Multi-access device according to claim 7, wherein the data transmitted via one of said second data transmission circuits are located in said common data resource at locations having successive addresses and the corresponding one of said second address generation means includes a counter to provide the next successive address of these data to said common data resource via said second and third address transmission circuits.

10. Multi-access device according to claim 2, wherein one of said second data transmission circuits, one of said data buffer circuits and one of said third data transmission circuits are used for the transmission of data from said common data resource to a particular one of said second stations, and another of said second data transmission circuits, another of said data buffer circuits and another of said third data transmission circuits are used for the transmission of data from said particular second station to said common data resource.

11. Multi-access device according to claim 1, wherein said common data resource is constituted by a Random-Access-Memory.

* * * * *